(12) United States Patent
Poertner et al.

(10) Patent No.: US 10,532,610 B2
(45) Date of Patent: Jan. 14, 2020

(54) BICYCLE RIM WITH BRAKE TRACK

(71) Applicants: Josh Poertner, Indianapolis, IN (US); Andrew Truemper, Indianapolis, IN (US)

(72) Inventors: Josh Poertner, Indianapolis, IN (US); Andrew Truemper, Indianapolis, IN (US)

(73) Assignee: SRAM, LLC, Chicago, IL (US)

( * ) Notice: Subject to any disclaimer, the term of this patent is extended or adjusted under 35 U.S.C. 154(b) by 345 days.

(21) Appl. No.: 14/304,646

(22) Filed: Jun. 13, 2014

(65) Prior Publication Data

US 2015/0360510 A1    Dec. 17, 2015

(51) Int. Cl.
*B60B 21/00* (2006.01)
*B60B 21/08* (2006.01)
*B62L 1/10* (2006.01)

(52) U.S. Cl.
CPC ............... *B60B 21/08* (2013.01); *B62L 1/10* (2013.01)

(58) Field of Classification Search
CPC ........ B60V 5/02; B60V 1/003; B60V 1/0223; B60V 1/0215; B60V 21/025; B60V 21/062; B60V 21/08; B60B 21/00; B60B 5/02
USPC ...... 301/95.104, 64.704, 58, 64.702, 95.101, 301/95.105, 95.102, 37.108
See application file for complete search history.

(56) References Cited

U.S. PATENT DOCUMENTS

| | | | | |
|---|---|---|---|---|
| 3,433,327 | A * | 3/1969 | Regis | B60B 21/08 188/218 XL |
| 3,732,951 | A | 5/1973 | Hata et al. | |
| 4,741,578 | A | 5/1988 | Viellard | |
| 5,486,223 | A * | 1/1996 | Carden | A61L 27/04 257/E23.112 |
| 5,564,793 | A * | 10/1996 | Whiteford | B60B 5/02 301/104 |
| 6,065,812 | A * | 5/2000 | Lee | B60B 21/062 301/95.101 |
| 6,120,105 | A * | 9/2000 | Chern | B60B 21/025 301/95.104 |
| 6,273,518 | B1 | 8/2001 | Chen | |
| 6,283,557 | B1 * | 9/2001 | Okajima | B60B 1/0215 301/58 |
| 6,354,668 | B2 * | 3/2002 | Okajima | B60B 1/0215 301/58 |
| 6,679,561 | B2 * | 1/2004 | Addink | B60B 1/0223 301/55 |
| 7,452,036 | B1 * | 11/2008 | Sulahian | B60B 7/01 301/37.108 |

(Continued)

FOREIGN PATENT DOCUMENTS

| | | | | |
|---|---|---|---|---|
| CA | 2524817 | A1 * | 4/2006 | .......... G06Q 30/016 |
| DE | 202007007997 | | 8/2007 | |

(Continued)

*Primary Examiner* — Hau V Phan (57) ABSTRACT

A rim for a bicycle includes a radially outer tire-engaging portion, a radially inner spoke-engaging portion, a first sidewall and a second sidewall spaced apart from the first sidewall. A brake track is located on the first and second sidewalls including a plurality of grooves formed therein. Each of the plurality of grooves has a radially innermost point and a radially outermost point, wherein the radially outermost point is circumferentially aft of the radially innermost point relative to a forward circumferential travel direction of the rim.

25 Claims, 5 Drawing Sheets

(56) References Cited

U.S. PATENT DOCUMENTS

| | | | |
|---|---|---|---|
| 8,002,362 B2* | 8/2011 | Colegrove | B60B 5/02 301/95.104 |
| 8,756,814 B2* | 6/2014 | Watarai | B60B 21/00 29/894.35 |
| 8,905,491 B2* | 12/2014 | Koshiyama | B60B 1/003 301/95.102 |
| 9,044,998 B2* | 6/2015 | Mercat | B60B 5/02 |
| 2003/0107260 A1* | 6/2003 | Ording | B60B 5/02 301/95.102 |
| 2007/0102992 A1* | 5/2007 | Jager | B29C 70/462 301/30 |
| 2007/0131499 A1* | 6/2007 | Seksaria | F16D 51/10 188/218 R |
| 2009/0058178 A1* | 3/2009 | Palmer | B60B 21/08 301/37.108 |
| 2011/0233005 A1* | 9/2011 | Lee | B60T 1/06 188/24.13 |
| 2012/0056468 A1* | 3/2012 | Tsai | B60B 5/02 301/95.103 |
| 2013/0309407 A1* | 11/2013 | Lee | B05D 5/083 427/384 |

FOREIGN PATENT DOCUMENTS

| | | | |
|---|---|---|---|
| DE | 202007007997 U1 | 8/2007 | |
| EP | 1018443 | 11/2004 | |
| EP | 2524817 | 11/2012 | |
| EP | 2524817 A1 * | 11/2012 | B60B 5/02 |
| EP | 2374632 | 1/2013 | |
| EP | 2374634 | 3/2013 | |
| EP | 2765009 | 8/2014 | |
| EP | 2765009 A1 | 8/2014 | |
| FR | 1491485 | 8/1967 | |
| FR | 1491485 A | 8/1967 | |

* cited by examiner

BICYCLE RIM WITH BRAKE TRACK

BACKGROUND OF THE INVENTION

This invention relates to a bicycle rim having a brake track. More particularly, the bicycle rim includes non-random surface features in the form of directional grooves.

Bicycle wheels and rims have been in use for well over a century. Historically, bicycle rims have been made of wood, steel or aluminum. However, some bicycle rim manufacturers have begun to produce bicycle rims of other materials, such as lightweight fiber-reinforced plastics (FRPs), including carbon fiber, fiberglass, and/or nylon fibers, for example, that are mixed in a curable resin such as epoxy-based resins, phenolic-based resins and/or ester-based resins. Of these composite rims, some have been made entirely of FRP composite materials ("full composite wheels"), whereas others have incorporated components of different materials in addition to FRP composites ("multi-component rims").

Carbon fiber rim brake surfaces are difficult to design. Early carbon rims used the molded surface of the rim structure itself as a brake track or braking surface, which was generally troublesome since the as-molded rims typically had a thin layer of mold release embedded in the surface, the presence of which was not suitable for braking since mold release materials yield a low coefficient of friction. Mold release is used to ease the removal of the rim from the mold during manufacturing. After a short period of brake use, the mold release and outer layer of epoxy on the rim is worn away, exposing the vulnerable carbon fiber beneath. It is easily understandable why it is disadvantageous to wear down and/or break the structural carbon fibers of the rim, because over time the rim is gradually weakened. Carbon surfaces are relatively poor at resisting wear and can provide poor frictional performance, especially when wet. Thus, carbon fiber surfaces are generally unsuitable as brake tracks for FRP rims.

Later rims use fiberglass, quarts fiber, or Kevlar fibers in the brake track area of the rim or as an additional structure positioned on top of the structural rim material to form a brake track. These materials are considered to have better wear characteristics than carbon and provide varying degrees of improved braking performance.

One approach to provide a brake track involves the addition of a veil of silicon carbide fibers and/or micro-beads or micro-particles alone or in combination or mixed with glass in the brake track. The silicon carbide fibers are harder than glass and offer significantly improved wear performance as well as brake 'feel' but are very expensive and difficult to work with due to high fiber stiffness. The addition of silicon carbide fibers can add considerable manufacturing cost to the rim. While modern aircraft and auto racing brake rotors are currently being made from silicon carbide fibers, these materials are currently quite expensive, hard to process and are difficult to form into smaller radii structures, such as for a bicycle rim, especially in a manufacturing setting. This lack of pliability limits their application to rim design and potentially prohibits use for certain complex rim shapes. On the other hand, silicon carbide micro-beads have recently been used successfully in brake tracks.

Some rim manufacturers have experimented with post-applied 'ceramic' brake track coatings. These range from painted-on applications that are heat cured, to plasma-sprayed coatings. All of these coatings offer aggressive frictional surfaces but suffer from being very brittle, heavy and generally requiring high temperature application procedures that can damage the molded rim. These coatings also suffer from geometric application issues, since being post-applied, the brake surfaces are inherently imperfect and non-parallel due to lack of geometric control.

There is a demand, therefore, to provide a bicycle rim with a durable and cost-effective brake track with excellent braking characteristics. The invention satisfies the demand.

SUMMARY OF THE INVENTION

The invention includes, in one embodiment, a FRP rim with a brake track including a plurality of grooves in a particular configuration.

A rim for a bicycle includes a radially outer tire-engaging portion, a radially inner spoke-engaging portion, a first sidewall and a second sidewall spaced apart from the first sidewall. A brake track is located on the first and second sidewalls including a plurality of grooves formed therein. Each of the plurality of grooves has a radially innermost point and a radially outermost point, wherein the radially outermost point is circumferentially aft of the radially innermost point relative to a forward circumferential travel direction of the rim.

In other embodiments, the rim may include FRP. The plurality of grooves may be non-overlapping. Each of the plurality of grooves may be straight or arcuate. The plurality of grooves may be non-overlapping. The brake track may have a radially outer boundary and a radially inner boundary. The radially outermost point of each of the plurality of grooves may be adjacent to the outer boundary of the brake track. The radially outermost point of each of the plurality of grooves may be at the outer boundary of the brake track. The radially innermost point of each of the plurality of grooves may be adjacent to the inner boundary of the brake track. Each of the plurality of grooves may have an extent from the radially outermost point to the radially innermost point. The extent of each of the plurality of grooves may be without an inflection point. The extent of each of the plurality of grooves may be at least twice the length of a remaining portion of the groove. The extent of each of the plurality of grooves may be about five times the length of a remaining portion of the groove. The extent of each of the plurality of grooves may be generally inclined relative to the radial direction about 30-60 degrees or about 45 degrees. Each of the plurality of grooves may be wider adjacent the radially outermost point than the radially innermost point. Some or all of the plurality of grooves is continuous. Some or all of the plurality of grooves may be discontinuous. The plurality of grooves may be spaced in the brake track at a density of about 3-10 per circumferential inch. Each of the plurality of grooves may be from about 0.01 inches to about 0.05 inches in depth. The plurality of grooves may be in a repeating pattern.

These and other features and advantages of the present invention will be more fully understood from the following description of one or more embodiments of the invention, taken together with the accompanying drawings.

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents.

Figure 1:
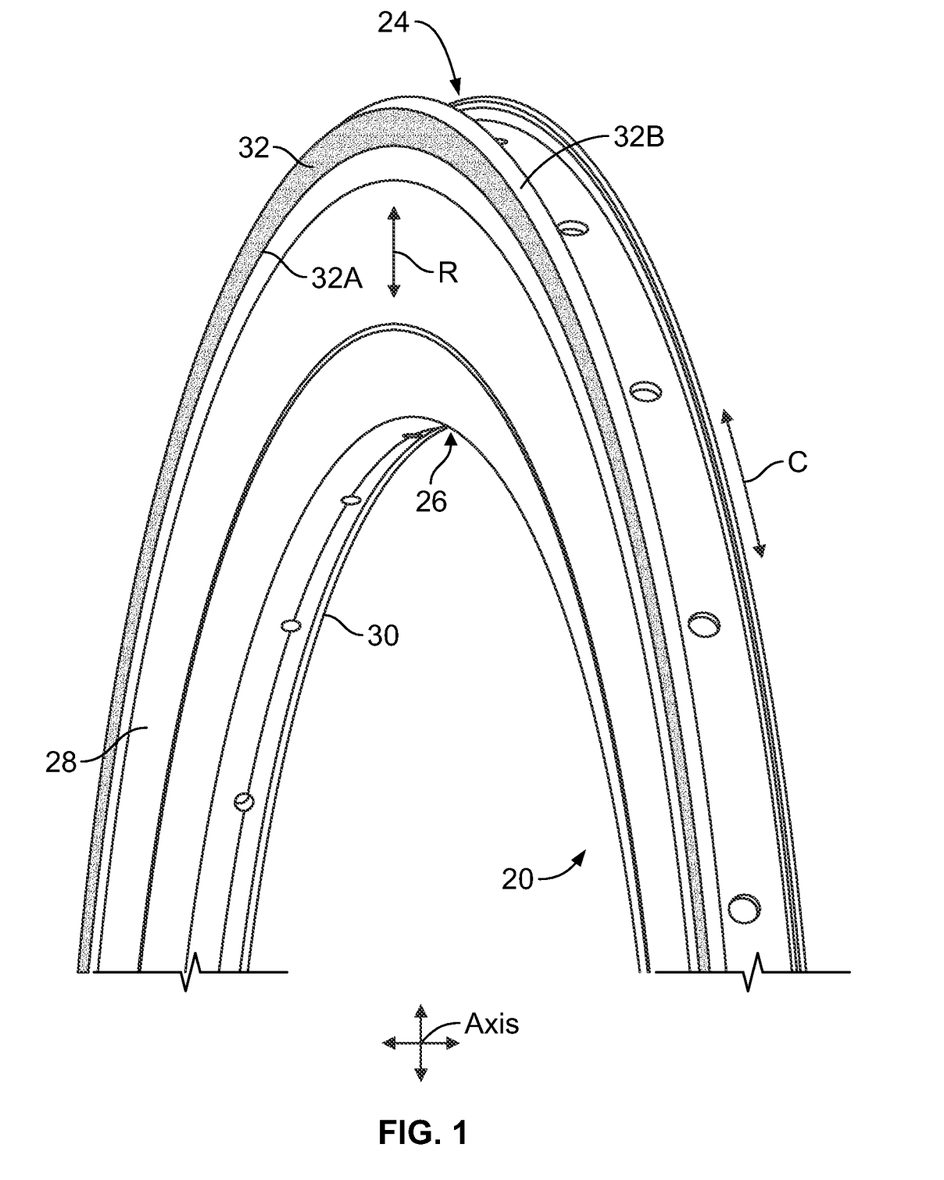
FIG. 1 is a partial perspective view of a bicycle rim.

FIG. 1 shows a wheel rim 20 with a brake track generally indicated at 32. The rim 20 generally includes a radially outer tire-engaging portion 24, a radially inner spoke-engaging portion 26, and a first sidewall 28 and a second sidewall 30 spaced apart from the first sidewall. The first and second sidewalls 28, 30 may extend generally radially between the tire-engaging and spoke-engaging portions 24, 26 to form the shape of the rim 20 or a portion thereof. It will be understood that any rim shape that includes a portion capable of functioning as a brake track 32 is contemplated by the invention.

Figure 2:
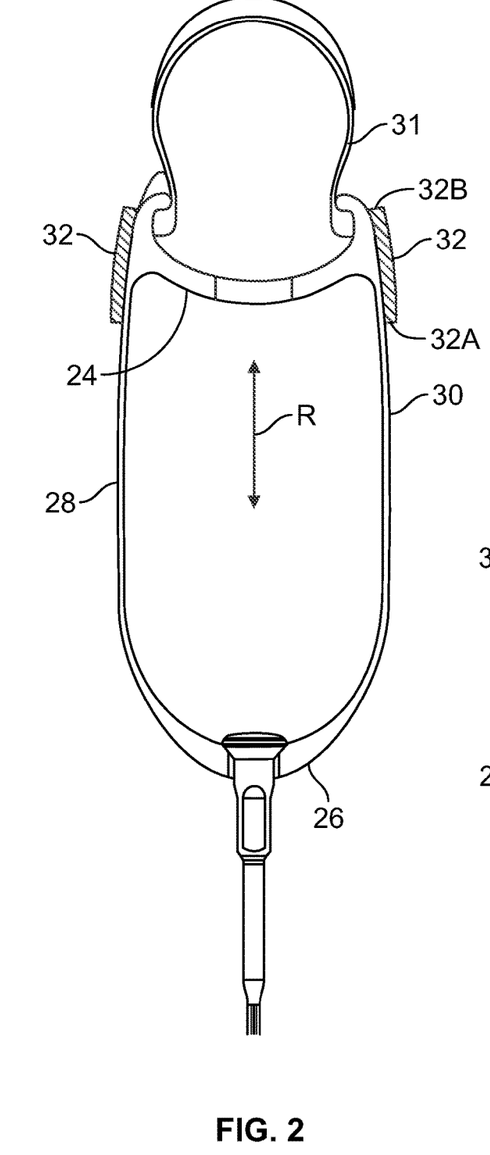
FIG. 2 is a cross-sectional view of a clincher-style rim with a brake track.

The brake track 32 may be positioned in a conventional location on the first and second sidewalls 28, 30. A clincher type rim 20 is shown in FIG. 2, for a clincher tire 31, but the invention contemplates non-clincher type rims, e.g., tubular or sew-up style rims (FIG. 3) for a tubular tire 33. The tire-engaging and spoke-engaging portions 24, 26 and first and second sidewalls 28, 30 may be in the form of a toroid but any suitable rim shape is contemplated.

The rim 20 may be made of FRP, i.e., fiber-reinforced plastic, in one embodiment formed of a major portion of carbon fiber, although it will be understood that a wide variety of composite materials and combinations of composite materials may be used to form the fiber-reinforced rim. The rim 20 may be made of other materials, like steel or aluminum, for example.

In the figures, the radial direction is indicated at "R" and the circumferential direction is indicated at "C." In the figures, the forward direction of travel of the rim 20, as when built into a wheel and provided on a bicycle (not shown), is indicated by arrow "F." The forward direction of travel is the circumferential direction that the wheel rotates when mounted to a bicycle that is moving in a forward direction. For example, viewed from the right side of a bicycle, i.e., the side that normally includes a crank arm and chainrings, the wheels, and thus the rims, rotate clockwise. The figures (except FIGS. 2 and 3) are shown with a rim viewed from the left side, and rotate counterclockwise when the bicycle wheel is traveling forward.

The brake track 32 is an area of the sidewalls 28, 30 that is adjacent to or contactable by brake pads of a bicycle (not shown) as is well-known. The brake track 32 may be seen in FIGS. 1-3, for example. One such brake track 32 is located on each of the first and second sidewalls 28, 30. The brake track 32 may be a surface of the material that forms the structure of the wheel rim itself, or in the alternative, may be a surface of, or in the alternative, a layer or layers of distinct material bonded to or otherwise attached to the structure of the wheel rim. Each brake track 32 includes a radially inner boundary 32A and a radially outer boundary 32B.

Referring to FIGS. 4-12, the brake track 32 includes surface features 40. The surface features 40 of the brake track 32 are defined by or include a plurality of grooves 42. The grooves may be formed or molded in to the surface or brake track 32 of the rim 20. In one embodiment, the grooves 42 may have a depth of about 0.01 inches to about 0.04 inches. While depths exceeding 0.05 inches may cause more pad wear than desired and may be difficult to manufacture, the invention contemplates such depths. The grooves 42 may be non-overlapping and preferably are present in a repeating pattern.

In each example (FIGS. 4-12) a common aspect of the surface features 40 is that each groove 42 has a radially innermost point 42B and a radially outermost point 42A, wherein the radially outermost point is circumferentially aft of the radially innermost point relative to a forward circumferential travel direction of the rim.

In other words, most of each groove 42 is inclined or leans backwards or the reverse of the forward travel direction F wherein a brake pad contacting the rim 20 will tend to wipe debris and so on from the inside to the outside of the rim. The grooves 42 may be inclined away from the radial direction R about 30-60 degrees. The grooves 42 may be inclined away from the radial direction R about 45 degrees.

Figure 3:
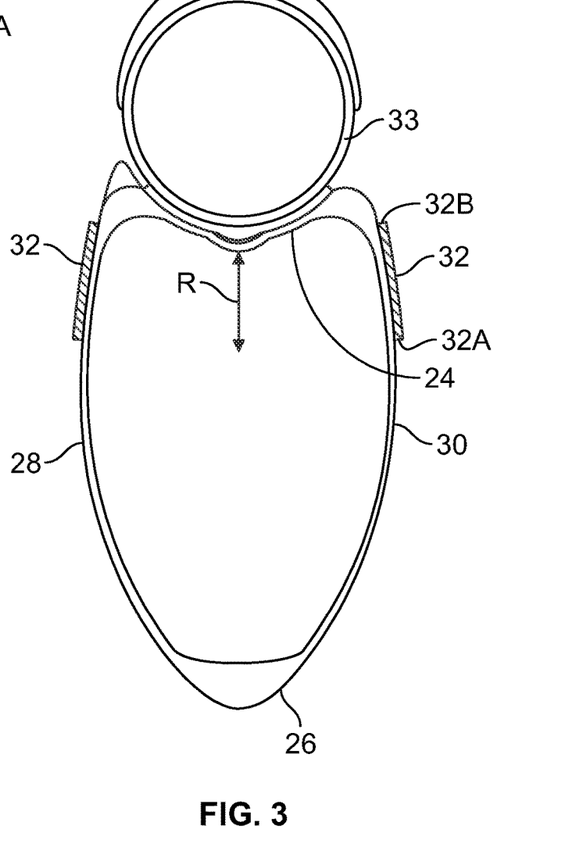
FIG. 3 is a cross-sectional view of a tubular-style rim with a brake track.

The brake track 32 may have a radial extent of about 9-11 millimeters and may be located about 1-3 millimeters from the outermost extent of the outer tire-engaging portion 24. The thickness of the brake track 32 shown in FIGS. 2 and 3 is not to scale. The width of the rim 20 from the first sidewall to the second sidewall 28, 30 at the brake track 32 can be from about 19-24 millimeters.

Figure 4:
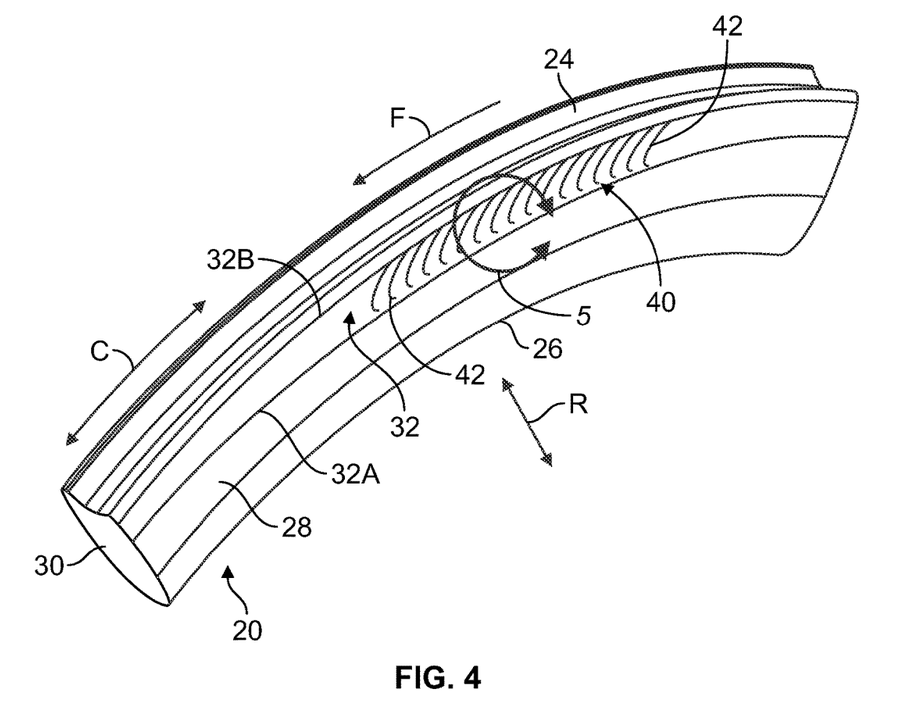
FIG. 4 is a side view of a bicycle rim and brake track with a first embodiment of non-random brake track features.

FIG. 4 shows a plurality of generally arcuate, parallel grooves 42 formed in the brake track 32 of rim 20. The density or spacing of the grooves 42 may be about 3-10 grooves per inch measured in a circumferential direction B, but grooves at other densities may also provide similar or equivalent benefits. The curvature of each illustrated groove 42 may be considered a simple arc without an inflection point. Other curves are contemplated.

Figure 5A:
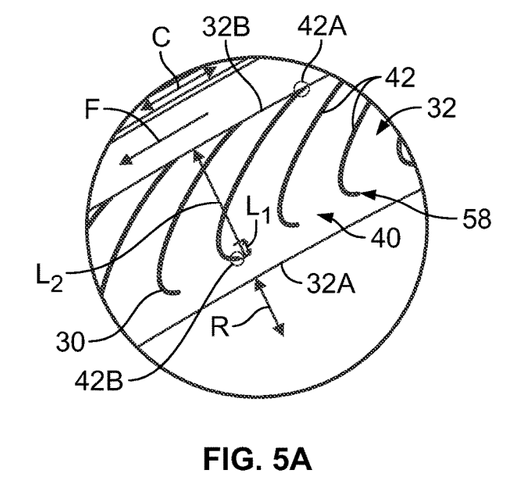
FIG. 5A is a close up view of the brake features of the rim shown in FIG. 4.
Figure 5B:
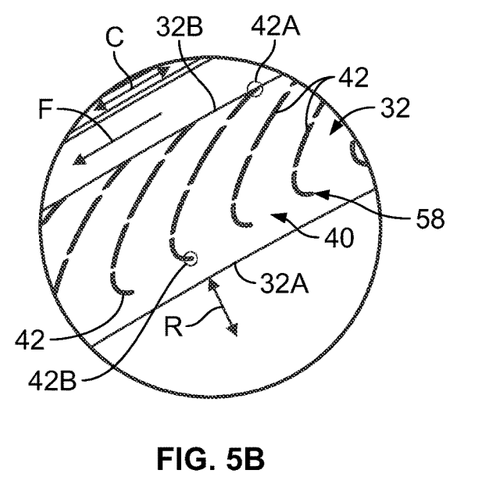
FIG. 5B is a variant of the rim of 5A with discontinuous grooves.

FIG. 5A shows the plurality of generally arcuate, parallel grooves 42 of FIG. 4 in a close-up view. FIG. 5B is the same as FIG. 5A, except the grooves 42 are interrupted or discontinuous, in contrast to other embodiments, which are continuous.

The grooves 42 may have an extent from the radially innermost point 42B to a radially outermost point 42A. A minor portion of the extent may have a length of $L_1$ and a major portion may have a length of $L_2$. $L_2$, in this embodiment, is about five times the length of $L_1$. The minor portion, having the length $L_1$, is inclined in a forward direction, while the major portion of the extent having length $L_2$, is inclined in a direction the reverse of the forward direction.

In one embodiment, the grooves 42 do not necessarily extend all of the way to the boundaries 32A, 32B of the brake track 32. For example, the radially innermost point 42B may be at or adjacent the radially inner boundary 32A. The radially outermost point 42A may be at or adjacent the radially outer boundary 32B.

Figure 6:
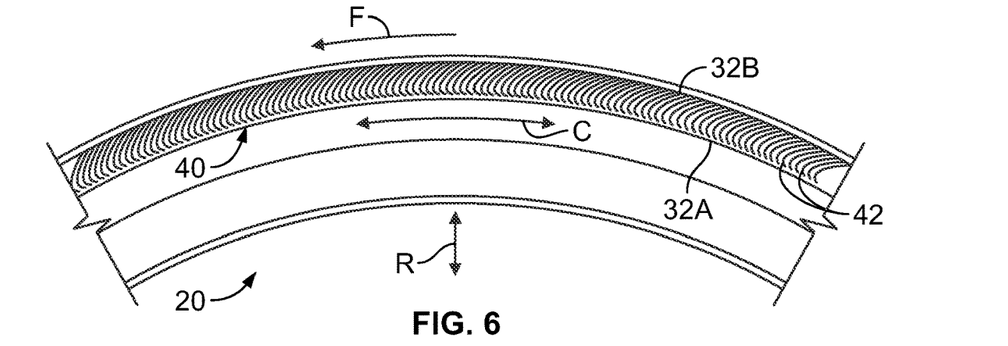
FIG. 6 is a side view of a bicycle rim and brake track with a second embodiment of brake track features.
Figure 7:
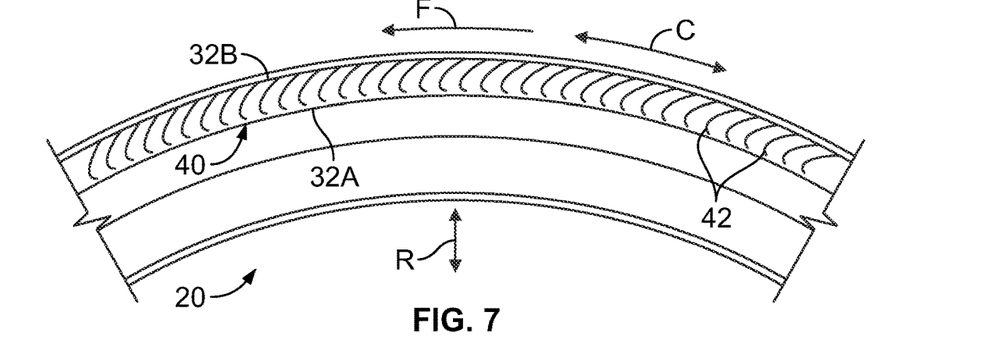
FIG. 7 is a side view of a bicycle rim and brake track with a third embodiment of brake track features.

FIG. 6 shows arcuate grooves 42 formed in the brake track 32 of rim 20. The density or spacing of the grooves 42 is about 10 grooves per inch measured in a circumferential direction C. FIG. 7 shows arcuate grooves 42 formed in the brake track 32 of rim 20. The density or spacing of the grooves 42 is about 3 grooves per inch measured in a circumferential direction C.

Figure 8:
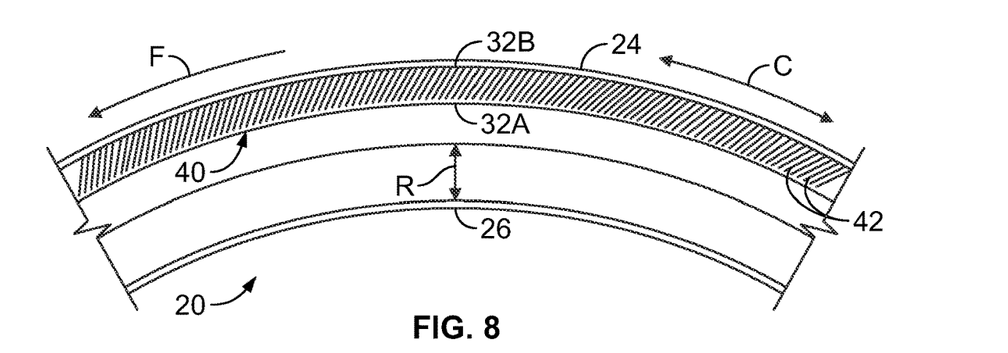
FIG. 8 is a side view of a bicycle rim and brake track with a fourth embodiment of brake track features.
Figure 9:
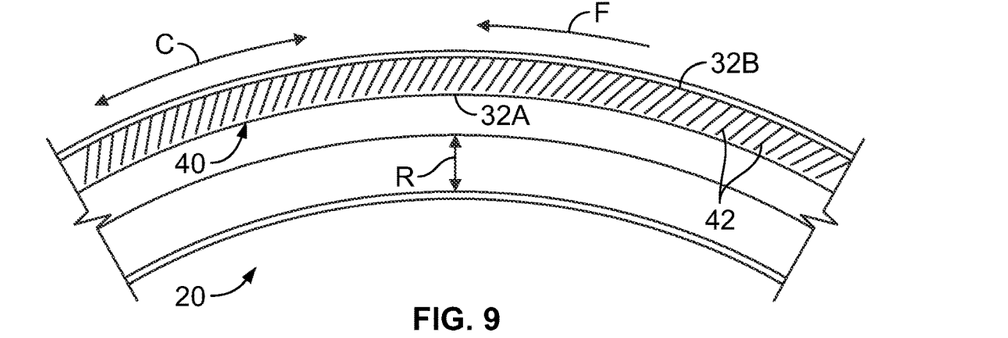
FIG. 9 is a side view of a bicycle rim and brake track with a fifth embodiment of brake track features.
Figure 10:
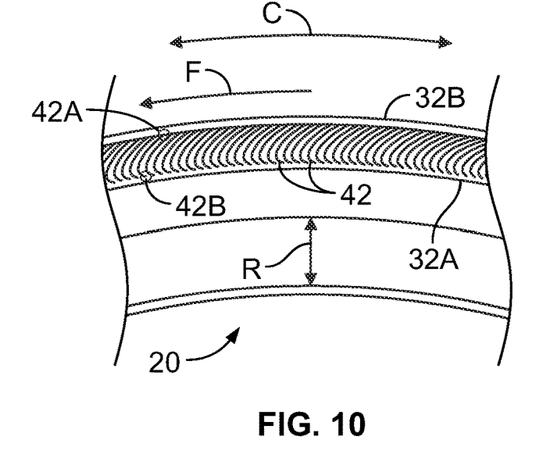
FIG. 10 is a close of view of the rim of FIG. 6.
Figure 11:
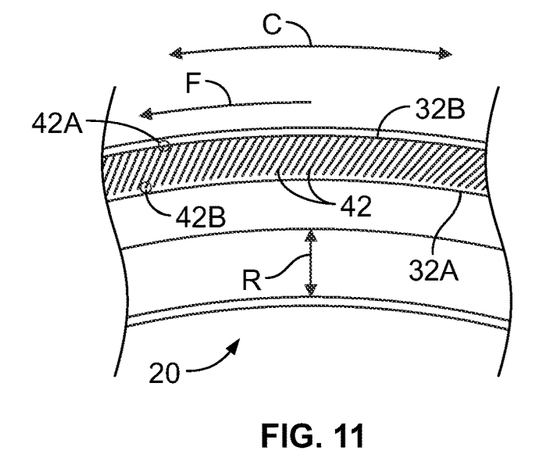
FIG. 11 is a close of view of the rim of FIG. 8.
Figure 12:
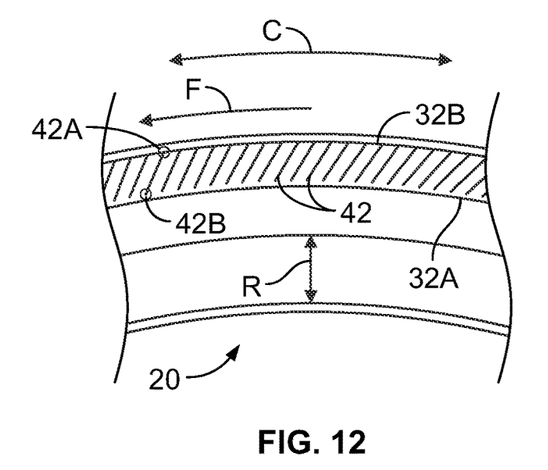
FIG. 12 is a close of view of the rim of FIG. 9.

FIG. 8 shows straight grooves 42 formed in the brake track 32 of rim 20. The density or spacing of the grooves 42 is about 3-10 grooves per inch. FIG. 9 shows arcuate grooves 42 formed in the brake track 32 of rim 20. The entire length of the arcuate grooves 42 of FIG. 9 is inclined radially and away from the forward travel direction F. In other words, the radially outermost point 42A of each groove 42 is aft, relative to the forward travel direction, of a respective radially innermost point 42B. The density or spacing of the grooves 42 is about 3-10 grooves per inch.

As noted above, the grooves 42 in all of the above variations may act as channels to direct water and the like off of the brake track 32. Also, the grooves 42 may direct fine debris off of the brake track 32. It is believed that a brake pad contacting the brake track 32 creates a wiping effect on the rim and moisture and debris are driven into the grooves 42 of the rim and are then driven radially outward by the forward motion of the rim.

The grooves 42 are believed to act as cooling relief channels under severe hot condition braking. The grooves 42 may act as pumping channels allowing air to be pumped radially outward from the underside of the brake pad to the top of the pad. This air movement serves to reduce temperatures at the rim surface. In addition, the channels serve to increase the surface area of the rim 20 in the area of the brake track, allowing for additional convective cooling, an important consideration for rim safety, even in view of the careful consideration of the material choices made to maximize both toughness of the rim and the tendency for epoxies to soften when heated.

The interaction of the grooves 42 on a brake pad is believed to improve brake feel and responsiveness at low braking forces. Under conditions where riders require only light stopping power, these grooves 42 have shown in testing to improve force modulation in contrast to smooth or randomly textured brake surfaces. This is especially important during wet braking where the traction of the tires is reduced. The effect is that the rider has consistent and linear braking power at low brake lever force in order to maintain traction with the road.

Dry performance testing shows rims with the inventive grooves 42 to exhibit higher peak braking power at higher brake cable forces when paired with a well-known brake pad. This results in shorter stopping distances under hard braking or panic braking situations.

At low lever forces in wet conditions, commonly used to modulate speed, the brake track 32 with the grooves 42 exhibit much better initial friction than a smooth surface. This is important for control of the bicycle and the maintenance of limited traction on wet and slippery road surfaces. Testing shows the directional texture to begin slowing the bike at a cable force of 20N (Newtons) compared to 45N with a smooth rim. The result for the rider is much better brake feel, and improved modulation across the range of lever forces the rider may choose to input. With traditional, smooth rim surfaces, there is essentially no stopping power below the 45-50N threshold, yet the wheel may lose traction at 100-120N of lever force. By initiating effective braking power at lower cable forces, the rider can use a much wider range of lever forces which is perceived as greater modulation, control and consistency.

To make an embodiment of the rim 20 according to one embodiment of the invention, the material of brake track 32 may be created by combining an amount of microparticles and/or fibers of reinforcement material with epoxy. This brake track material may be as simple as epoxy that has been mixed with a suitable percentage of silicon carbide microparticles, for example, and formed into a film and in one embodiment laid onto a fine veil or scrim of carbon, quartz, polyester, fiberglass, Kevlar® or other suitable material. This epoxy film or scrim layer may then be cut into strips or arcs which can be laminated directly onto an uncured fiber-reinforced epoxy rim. Some molding methods would also allow the micro-particle loaded film to be applied directly to the surface of the tool before the tool receives the uncured material. The tool would be then closed and heat and pressure applied to cure the fiber reinforced epoxy structure as well as the micro-particle loaded or reinforced epoxy brake surface. After a sufficient amount of time, e.g., generally from thirty minutes to two hours of cure time, the cured rim 20 may be removed from the mold, excess resin would be removed and the rim would be ready to have the outmost part of the epoxy of the brake track 32 removed to expose the microparticles. This step may not be necessary but wet weather braking performance on a new carbon fiber rim is typically poor and the surface may take weeks to months to 'break in' as brake pads slowly abrade away the epoxy to expose the microparticles embedded within. In one embodiment, therefore, the epoxy covering the microparticles is lightly abraded away in an abrasive blasting operation. This blasting can be fine-tuned using a media such as garnet which is harder than the epoxy resin but less hard than the abrasive particulates molded into the brake surface. Other materials may be used to remove the epoxy covering such as walnut shells, a less aggressive abrasive agent than garnet removing less epoxy, thereby producing a less aggressive brake track surface.

The microparticles in the brake track 32 may be any type of high hardness material, such as for example, ceramic materials, silicon carbide, silicon nitride, aluminum oxide, boron carbide, titanium oxide, emery, or other materials having a suitable hardness and in a particulate form capable of being adapted or formed to the shape of the rim 20. High hardness metallic particles could also be substituted, though they may not exhibit the same longevity as the above noted family of materials. The shapes of the microparticles may be generally compact, rounded, spherical, angular, amorphous, platelet, or any other suitable non-fibrous shape conformable to various rim shapes, especially in a manufacturing setting. In the alternative, the epoxy of the brake track may be reinforced with fiberous materials, such as carbon, fiberglass, and the like.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A rim for a bicycle, comprising:
a radially outer tire-engaging portion;
a radially inner spoke-engaging portion;
a first sidewall;

a second sidewall spaced apart from the first sidewall, the first sidewall and the second sidewall formed of a first material; and a brake track formed of a second material, the second material different than the first material, and located on the first and second sidewalls, the second material of the brake track including a plurality of grooves formed therein, each of the plurality of grooves having a radially innermost point and a radially outermost point, wherein the radially outermost point is circumferentially aft of the radially innermost point relative to a forward circumferential travel direction of the rim.

2. The rim of claim 1, wherein the rim includes FRP.

3. The rim of claim 1, wherein the plurality of grooves is non-overlapping.

4. The rim of claim 1, wherein each of the plurality of grooves is straight.

5. The rim of claim 1, wherein each of the plurality of grooves is arcuate.

6. The rim of claim 1, wherein the plurality of grooves is non-overlapping.

7. The rim of claim 1, wherein the brake track has a radially outer boundary and a radially inner boundary.

8. The rim of claim 7, wherein the radially outermost point of each of the plurality of grooves is adjacent to the outer boundary of the brake track.

9. The rim of claim 8, wherein the radially outermost point of each of the plurality of grooves is at the outer boundary of the brake track.

10. The rim of claim 8, wherein the radially innermost point of each of the plurality of grooves is adjacent to the inner boundary of the brake track.

11. The rim of claim 10, wherein the radially outermost point of each of the plurality of grooves is at the outer boundary of the brake track.

12. The rim of claim 1, wherein each of the plurality of grooves has an extent from the radially outermost point to the radially innermost point.

13. The rim of claim 12, wherein the extent of each of the plurality of grooves is without an inflection point.

14. The rim of claim 12, wherein the extent of each of the plurality of grooves is at least twice the length of a remaining portion of the groove.

15. The rim of claim 12, wherein the extent of each of the plurality of grooves is about five times the length of a remaining portion of the groove.

16. The rim of claim 12, wherein the extent of each of the plurality of grooves is generally inclined relative to the radial direction about 30-60 degrees.

17. The rim of claim 12, wherein the extent of each of the plurality of grooves is generally inclined relative to the radial direction about 45 degrees.

18. The rim of claim 1, wherein the each of the plurality of grooves is wider adjacent the radially outermost point than the radially innermost point.

19. The rim of claim 1, wherein some or all of the plurality of grooves is continuous.

20. The rim of claim 1, wherein some or all of the plurality of grooves is discontinuous.

21. The rim of claim 1, wherein the plurality of grooves are spaced in the brake track at a density of about 3-10 per circumferential inch.

22. The rim of claim 1, wherein each of the plurality of grooves are from about 0.01 inches to about 0.05 inches in depth.

23. The rim of claim 1, wherein the plurality of grooves are in a repeating pattern.

24. The rim of claim 1, wherein the pluralities of grooves are formed through a molding method.

25. The rim of claim 24, wherein the plurality of grooves are formed through a molding of uncured material.

* * * * *